United States Patent
Angeli et al.

(10) Patent No.: US 11,851,365 B2
(45) Date of Patent: Dec. 26, 2023

(54) METHOD FOR TREATING A LEAD-CONTAINING GLASS THAT MAKES IT POSSIBLE TO LIMIT THE MIGRATION IN SOLUTION OF THE LEAD CONTAINED IN THIS GLASS

(71) Applicant: COMMISSARIAT À L'ÉNERGIE ATOMIQUE ET AUX ÉNERGIES ALTERNATIVES, Paris (FR)

(72) Inventors: Frédéric Angeli, Chusclan (FR); Patrick Jollivet, Milhac-de-Nontron (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/753,924

(22) PCT Filed: Sep. 18, 2020

(86) PCT No.: PCT/FR2020/051622
§ 371 (c)(1),
(2) Date: Mar. 18, 2022

(87) PCT Pub. No.: WO2021/053304
PCT Pub. Date: Mar. 25, 2021

(65) Prior Publication Data
US 2022/0371950 A1 Nov. 24, 2022

(30) Foreign Application Priority Data
Sep. 20, 2019 (FR) ...................................... 1910388

(51) Int. Cl.
*C03C 23/00* (2006.01)
(52) U.S. Cl.
CPC ........ *C03C 23/007* (2013.01); *C03C 23/0095* (2013.01)

(58) Field of Classification Search
None
See application file for complete search history.

(56) References Cited

U.S. PATENT DOCUMENTS

| | | | |
|---|---|---|---|
| 3,546,037 A | 12/1970 | Saelzle | |
| 2002/0192421 A1* | 12/2002 | Jennings | ............... C04B 41/009 |
| 2007/0040500 A1* | 2/2007 | Fukuda | ............... H10K 50/844 |
| | | | 313/512 |
| 2017/0183257 A1* | 6/2017 | Apitz | ....................... C03C 3/07 |

FOREIGN PATENT DOCUMENTS

| | | |
|---|---|---|
| DE | 1496666 A1 | 8/1970 |
| DE | 2218103 A1 | 10/1973 |
| DE | 4102886 A1 | 8/1992 |
| EP | 0575740 A1 | 12/1993 |
| JP | 108208276 A | 8/1996 |

OTHER PUBLICATIONS

Search Report for French application No. FR1910388 dated May 14, 2020.
International Search Report for PCT/FR2020/015622 dated Feb. 9, 2021 and translation thereof.
Written Opinion for PCT/FR2020/015622 dated Feb. 9, 2021 dated Feb. 9, 2021.

* cited by examiner

*Primary Examiner* — Cynthia Szewczyk
(74) *Attorney, Agent, or Firm* — Pearne & Gordon LLP

(57) ABSTRACT

A method for treating a lead-containing glass that makes it possible to limit the migration of the lead contained in this glass, the method successively comprising the following distinct steps: a step of placing the lead-containing glass in contact with a solution comprising perchloric acid; a step of heat treatment of the glass at a temperature less than or equal to the glass transition temperature of the glass.

17 Claims, 2 Drawing Sheets

METHOD FOR TREATING A LEAD-CONTAINING GLASS THAT MAKES IT POSSIBLE TO LIMIT THE MIGRATION IN SOLUTION OF THE LEAD CONTAINED IN THIS GLASS

CROSS-REFERENCE TO RELATED APPLICATIONS

This is a National Stage application of PCT international application PCT/FR2020/051622, filed on Sep. 18, 2020, which claims the priority of French Patent Application No. 1910388, filed Sep. 20, 2019, both of which are incorporated herein by reference in their entirety.

TECHNICAL FIELD

The present invention relates to a method for treating a lead-containing glass that makes it possible to limit the migration of the lead contained in this glass, in particular when the glass is in contact with an aqueous medium.

The invention has a use in particular for the treatment of a glass of the crystal type, in particular, a glass comprising at least 24% by weight of lead oxide or even at least 30% by weight of lead oxide.

PRIOR ART

The surface treatments of a lead-containing glass to decrease the salting-out of the lead are particularly important when the objects containing such a glass can be intended to be in contact with the mouth (such as jewels, dishes) so as to avoid the ingestion of lead by the human organism.

Indeed, lead is a metal toxic for the organism which, ingested according to certain doses, can cause negative effects for the central nervous system, the circulatory system or even the digestive system. This is the reason why numerous works have been carried out to put in place a surface treatment of these objects, so as to limit the phenomenon of salting-out of the lead.

In particular, in FR 2700764, a method is described for surface treatment of items made of glass, in particular made of crystal, that comprises an operation of placing the item made of glass, the treatment of which it is desired to ensure, in contact with a reactive gas coming from the vaporisation of a powder of sulphate(s) of ammonium and of aluminium at a temperature not exceeding the softening temperature of the item made of glass, for example, a temperature of 490° C., followed, after cooling of the item, by an operation of washing the item thus treated to eliminate therefrom any powdery residue.

This method remains, however, difficult to control and can turn out to be difficult to apply in a homogenous manner onto items having complex shapes, such as carafes. Moreover, this method imposes, for hollow objects open towards the outside, closing the end thereof in order for the powder to remain confined inside the objects during the formation of the vapours.

In light of that which already exists, the inventors set the goal of developing a method for treating a lead-containing glass which does not have the aforementioned disadvantages and which makes it possible to obtain, in particular, a substantial reduction in the rate of salting-out of lead of the latter, when this glass is made to be in contact with an aqueous medium and, in particular, during the alteration of the latter, this method also having to be in line with the evolution of the toxicological data on ingestion of lead into the organism (with an expected strong reduction in the detection limits) and the possible toughening of the European REACH and food-contact regulations, which could very strongly restrict the acceptable concentrations of lead in solution.

DISCLOSURE OF THE INVENTION

Thus, the invention relates to a method for treating a lead-containing glass that makes it possible, in particular, to limit the migration of the lead contained in this glass, said method successively comprising the following distinct steps:
- a step of placing the lead-containing glass in contact with a solution comprising perchloric acid;
- a step of heat treatment of the glass at a temperature less than or equal to the glass transition temperature of the glass.

Via the successive implementation of these two distinct successive steps, a synergy contributing to a substantial reduction in the phenomenon of salting-out of lead of the glass thus treated, when it is placed in contact with an aqueous medium, even when the latter is an acidic medium, was observed. In particular, results were observed, according to the standard ISO 7086 in terms of salting-out of lead obtained with the glasses treated in accordance with the method of the invention, that were similar to those obtained with a glass having undergone a cementation treatment.

First of all, the method of the invention comprises a step of placing the lead-containing glass in contact with a solution comprising perchloric acid.

Perchloric acid is understood as meaning the acid satisfying the formula $HClO_4$.

More specifically, the solution comprising perchloric acid is an aqueous solution of perchloric acid and, more precisely, a solution comprising, besides water, exclusively perchloric acid.

The perchloric acid can be present in the solution at a concentration ranging from $10^{-3}M$ to $10^{-1}M$, preferably, equal to $10^{-2}M$.

The step of placing in contact can be carried out for a duration ranging from 12 hours to 36 hours, for example, 24 hours.

Finally, advantageously, the step of placing in contact does not require heating, which means, in other words, that it is implemented at ambient temperature, that is to say the temperature of the environment of the premises, in which the method is implemented, this temperature being capable of ranging from 15° C. to 27° C., for example, 22° C.

Concretely, the step of placing in contact can involve submerging the glass comprising the lead in the solution comprising perchloric acid or, when the glass is in the form of a shaped product including a hollow cavity, such as a drinking glass or a carafe, filling the cavity of this product with the solution comprising perchloric acid.

According to a particular case, the step of placing in contact can be carried out with an aqueous solution of perchloric acid having a concentration ranging from $10^{-3}M$ to $10^{-1}M$, preferably equal to $10^{-2}M$, at ambient temperature (and more specifically, 22° C.) for 24 hours.

Once the step of placing in contact has been completed, the method of the invention comprises a step of heat treatment at a temperature less than or equal to the glass transition temperature of the glass, preferably, for a duration ranging from 12 hours to 36 hours.

Advantageously, the step of heat treatment is carried out at a temperature lower than the glass transition temperature of the glass and, more specifically, which can go up to 150° C. below the glass transition temperature of the glass.

The step of heat treatment can be carried out for a duration ranging from 12 hours to 36 hours.

More specifically, the step of heat treatment can be carried out at a temperature ranging from 200° C. to 700° C., advantageously, from 300 to 600° C. and, more particularly, for a duration ranging from 12 hours to 36 hours.

In particular, when the glass is a glass comprising 24% by weight of PbO lead oxide relative to the total weight of the glass, the step of heat treatment can be carried out at a temperature ranging from 400 to 500° C. and more particularly can be equal to 450° C.

Concretely, this step of heat treatment can involve heating the lead-containing glass in a chamber heated to the suitable temperature.

This method is adapted, in particular, for lead-containing glasses of the crystal type, such as:
- glasses comprising at least 24% by weight of PbO lead oxide relative to the total weight of the glass (these glasses can be called "Lead crystal 24%");
- glasses comprising at least 30% by weight of PbO lead oxide relative to the total weight of the glass (these glasses can be called "Full lead crystal 30%").

This method is completely adapted to be implemented with glass already in the form of objects containing this lead-containing glass (the treatment method thus being a method for treating an object made of lead-containing glass), and these objects can be:
- objects for food use, such as dishes like drinking glasses, carafes;
- objects for decorative use, such as jewels.

Other features and advantages of the invention will appear upon reading the following additional description which relates to an example of preparation.

Of course, this additional description is only given as an illustration of the invention and is in no way a limitation.

DETAILED DISCLOSURE OF SPECIFIC EMBODIMENTS

Example 1

First, a first series of trials is carried out with a glass powder (more specifically, a Baccarat commercial glass comprising 24% by weight of PbO having a particle size of 63-125 μm, having a specific surface area of 535 cm$^2 \cdot$g$^{-1}$ and having a glass transition temperature of 458° C.), said powder being subjected to the following conditions:

$1^{st}$ trial: Placed in contact with an aqueous solution of HClO$_4$; T=22° C.; Concentration: 10$^{-3}$M (curve b in FIG. 1) or 10$^{-4}$M (curve c in FIG. 1); Duration of contact: 1 day;

$2^{nd}$ trial: Placed in contact with an aqueous solution of H$_3$PO$_4$; T=22° C.; Concentration: 10$^{-3}$M (curve d in FIG. 1) or 10$^{-4}$M (curve e in FIG. 1); Duration of contact: 1 day;

$3^{rd}$ trial: Placed in contact with an aqueous solution comprising HClO$_4$/H$_3$PO$_4$; T=22° C.; Concentration: 4*10$^{-3}$M (pH=2.4) (curve fin FIG. 1); Duration of contact: 1 day;

$4^{th}$ trial: Placed in contact with an aqueous solution comprising K$_2$S$_2$O$_5$; T=22° C.; Concentration: 1M (pH=0) (curve g in FIG. 1) or 2M (curve h in FIG. 1); Duration of contact: 1 day;

$5^{th}$ trial: Placed in contact with an aqueous solution comprising H$_2$SO$_4$; T=22° C.; Concentration: 0.5M (curve i in FIG. 1), 4*10$^{-3}$M (curve j in FIG. 1) or 10$^{-4}$M (curve k in FIG. 1); Duration of contact: 1 day;

$6^{th}$ trial: Annealing at 450° C. for 1 day (curve l in FIG. 1);

$7^{th}$ trial: Annealing at 500° C. for 1 day (curve m in FIG. 1);

$8^{th}$ trial: Annealing at 550° C. for 1 day (curve n in FIG. 1);

$9^{th}$ trial: Annealing at 420° C. for 10 days (curve o in FIG. 1);

$10^{th}$ trial: Placed in contact with an aqueous solution comprising Zn$^{2+}$ ions (400 mg·L$^{-1}$); T=22° C.; Duration of contact=1 day and pH=5.5 (curve p in FIG. 1);

$11^{th}$ trial: Placed in contact with an aqueous solution comprising Zn$^{2+}$ ions (400 mg·L$^{-1}$); T=22° C.; Duration of contact=1 day and pH=2.4 (curve q in FIG. 1).

The effectiveness of these trials was measured on the basis of the concentrations of lead analysed during the ISO 7086 test by placing the powders coming from these various trials in contact with a solution of acetic acid (4% by volume) for 24 hours at 22° C. according to a ratio (surface area of glass/volume of solution, called S/V) of 1000 m$^{-1}$ (or 187 mg of glass powder in 10 mL of solution of acetic acid) then by quantifying the lead concentration of the solution of acetic acid.

Figure 1:
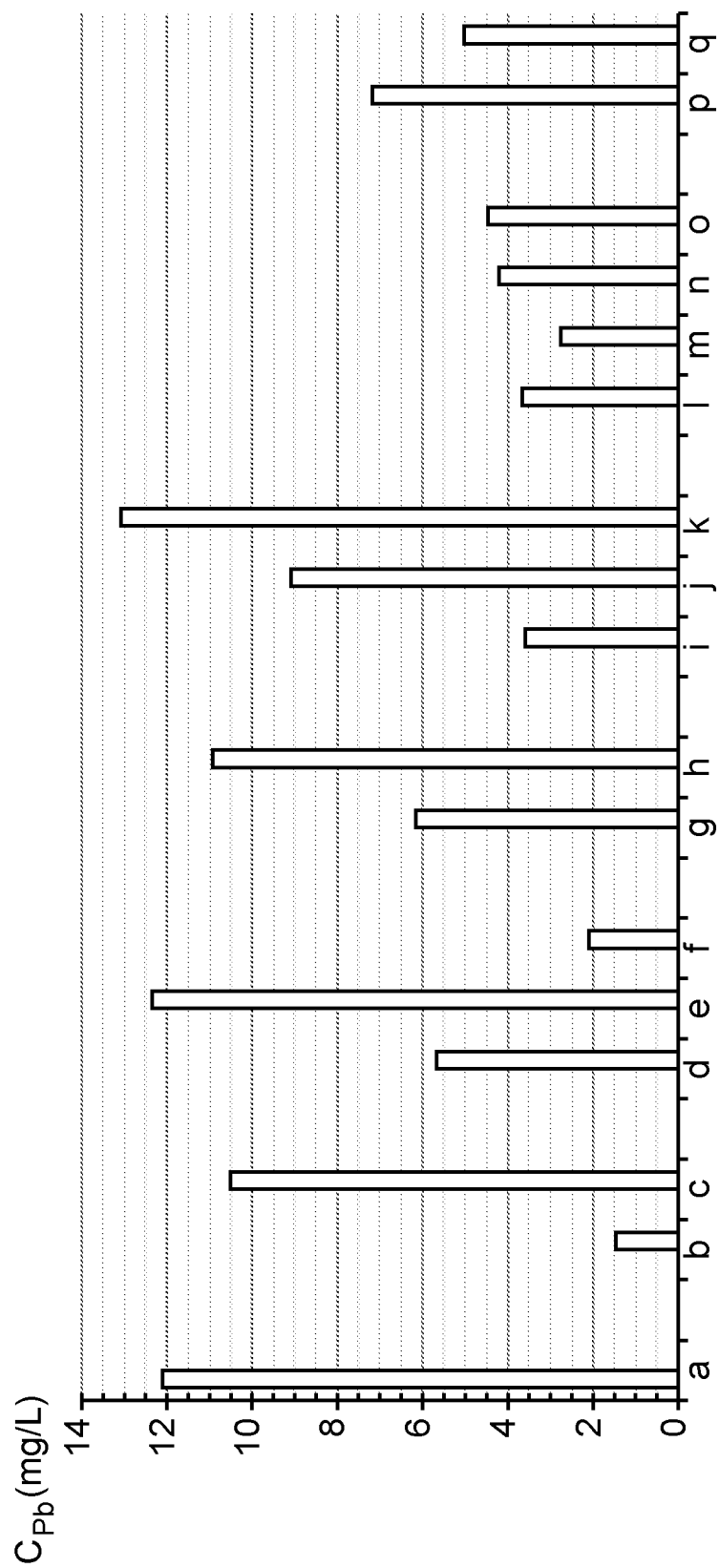
FIG. 1 is a graph illustrating the concentration of lead $C_{Pb}$ (in mg/L) for the various trials and for a reference for the first series of trials of example 1 below.

The concentrations of lead quantified in the solution of acetic acid with each of the aforementioned trials are reported in FIG. 1, which is a graph illustrating the concentration of lead $C_{Pb}$ (in mg/L) for the various trials (curves b to q as defined above) and for a reference (indicated as Ref., corresponding to the glass powder not having undergone any treatment and forming the reference concentration of lead released into solution, curve a in FIG. 1).

The most effective conditions with respect to the release of the lead are those obtained with HClO$_4$ perchloric acid and, in particular, with a concentration of 10$^{-3}$ mol·L$^{-1}$.

Starting from these effective conditions thus determined (namely, the use of perchloric acid), a second series of trials was carried out, still with the same type of glass powder (namely, a Baccarat commercial glass comprising 24% by weight of PbO having a particle size of 63-125 μm and having a specific surface area of 535 cm$^2 \cdot$g$^{-1}$), said powder being subjected to the following conditions:

$1^{st}$ trial: Placed in contact with an aqueous solution of HClO$_4$; T=22° C.; Concentration: 10$^{-3}$M; Duration of contact: 1 day (curve b in FIG. 2);

$2^{nd}$ trial: Placed in contact with an aqueous solution of HClO$_4$; T=22° C.; Concentration: 10$^{-3}$M; Duration of contact: 1 day followed by annealing at 450° C. (for 24 hours) (curve c in FIG. 2);

$3^{rd}$ trial: Placed in contact with an aqueous solution of HClO$_4$; T=22° C.; Concentration: 10$^{-2}$M; Duration of contact: 1 day (curve d in FIG. 2);

$4^{th}$ trial: Placed in contact with an aqueous solution of HClO$_4$; T=22° C.; Concentration: 10$^{-2}$M; Duration of contact: 1 day followed by annealing at 450° C. (for 24 hours) (curve e in FIG. 2);

5$^{th}$ trial: Placed in contact with an aqueous solution of HClO$_4$; T=22° C.; Concentration: 10$^{-1}$M; Duration of contact: 1 day (curve fin FIG. 2);

6$^{th}$ trial: Placed in contact with an aqueous solution of HClO$_4$; T=22° C.; Concentration: 10$^{-1}$M; Duration of contact: 1 day followed by annealing at 450° C. (for 24 hours) (curve g in FIG. 2);

7$^{th}$ trial: Placed in contact with an aqueous solution of HClO$_4$ (10$^{-3}$M)+Zn$^{2+}$ (100 mg·L$^{-1}$); T=22° C.; Duration of contact: 1 day (curve h in FIG. 2);

8$^{th}$ trial: Placed in contact with an aqueous solution of HClO$_4$ (10$^{-3}$M)+H$_2$O$_2$ (10% by volume); T=22° C.; Duration of contact: 1 day (curve i in FIG. 2).

Figure 2:
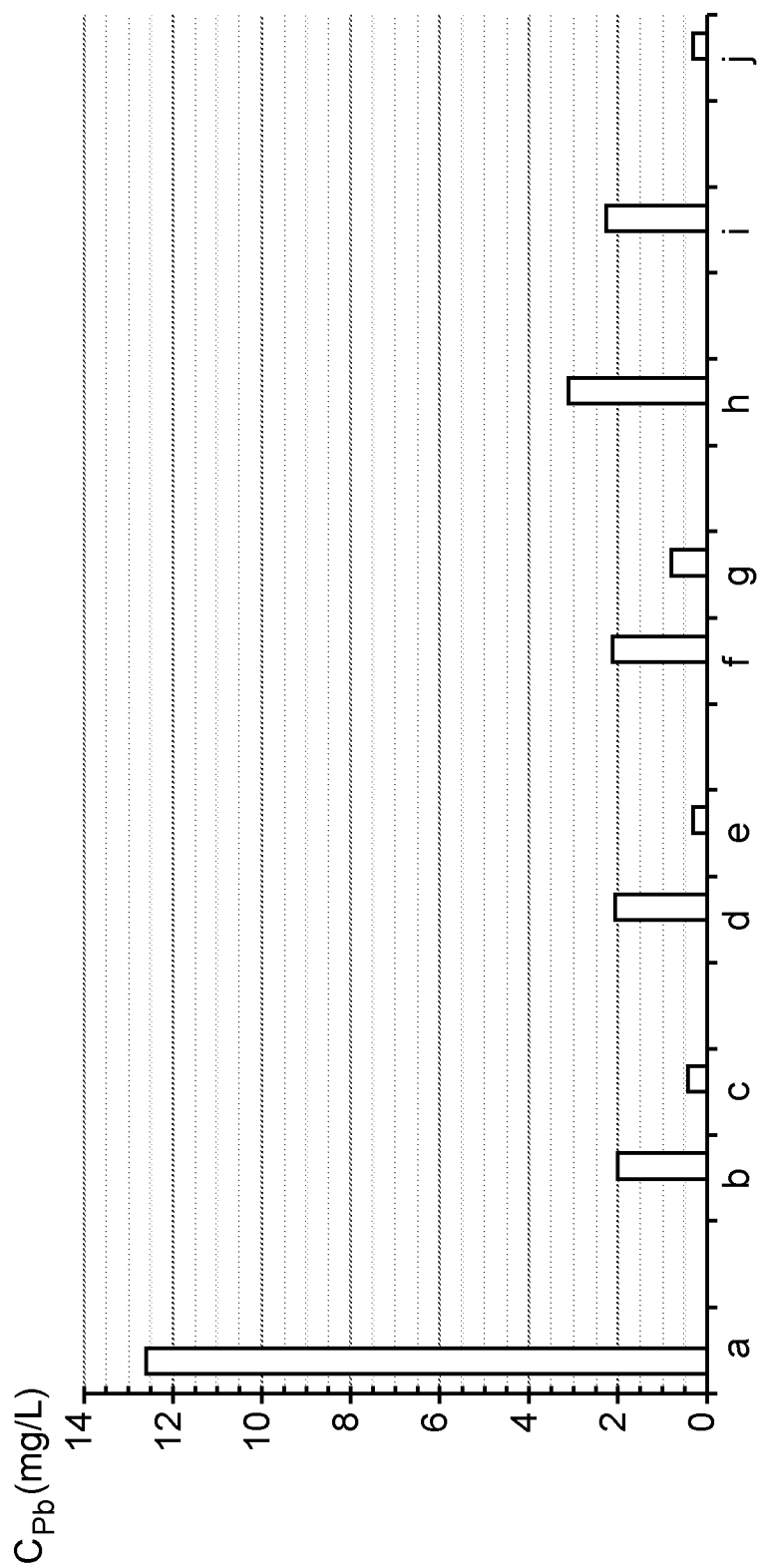
FIG. 2 is a graph illustrating the concentration of lead $C_{Pb}$ (in mg/L) for the various trials, for a reference and a cemented glass powder for the second series of trials of example 1 below.

The concentrations of lead quantified in the solution of acetic acid according to the standard ISO 7086 with each of the aforementioned trials and with a ratio (S/V)=1000 m$^{-1}$ are reported in FIG. 2, which is a graph illustrating the concentration of lead C$_{Pb}$ (in mg/L) for the various aforementioned trials (curves b to i) and for a reference (indicated as Ref., corresponding to the glass powder not having undergone any treatment and forming the reference concentration of lead released into solution, curve a in FIG. 2) and, also, for a cemented glass powder (indicated as cemented BAC, that is to say a glass powder having undergone a cementation treatment applied to the carafes, curve j in FIG. 2), said cemented glass powder leading to a reduction in the concentration of lead by a factor of 45 with respect to the powder not having undergone any treatment.

It appears that a heat treatment at 450° C. makes it possible to divide by at least a factor of approximately 3 the release of lead with respect to the trials carried out with the perchloric acid at the same concentration but without this heat treatment, the best result being obtained by a solution of 10$^{-2}$M perchloric acid with annealing of 450° C. (the release of lead being improved by a factor of 6 with respect to the equivalent trial without heat treatment and by a factor of 40 with respect to the reference).

It also appears that a heat treatment at 450° C. also makes it possible to obtain better results than those obtained with a solution of perchloric acid comprising Zn$^{2+}$ ions or H$_2$O$_2$ oxygenated water.

It should be noted, also, that the treatment with a 10$^{-2}$M solution of perchloric acid with annealing of 450° C. leads to performance of the same order of magnitude as the cemented glass powder but makes it possible to ensure better reproducibility, given that this treatment can be applied onto objects having a complex shape, insofar as this treatment being carried out via a liquid process makes it possible for all of the surface to be treated in a homogenous manner.

Example 2

In this example, trials are carried out with objects made of glass of the crystal type and, more specifically, with a Baccarat glass and a Saint-Louis flute (these two objects being made of a glass having a glass transition temperature of 458° C.).

These two objects were subjected to a treatment method comprising:

a step of placing the latter in contact with an aqueous solution of perchloric acid at 10$^{-2}$M at 22° C. for 1 day;

a step of heat treatment at 450° C. for 24 hours.

A visual test carried out after this treatment method shows that there is no difference with respect to the same objects not having undergone this method. This demonstrates that the treatment method does not alter the appearance of the objects.

The objects thus treated are also subjected to an ISO 7086 test with a solution of acetic acid (4% by volume) for 24 hours at 22° C., the volume of the solution being 50 mL (the ratio S/V being 100 m$^{-1}$ for the glass from Baccarat and 120 m$^{-1}$ for the flute from Saint-Louis). It appears from this test that for both objects, the factor of reduction of the release of lead is 40 with respect to the same untreated object.

What is claimed is:

1. A method for treating a lead-containing glass, the lead-containing glass comprising at least 24% by weight of lead oxide relative to the total weight of the glass, the method successively comprising the following distinct steps:
    (a) placing the lead-containing glass in contact with a solution comprising perchloric acid for between 12 and 36 hours;
    (b) separating the lead-containing glass from the solution to provide a lead-reduced glass;
    (c) heating the lead-reduced glass at a temperature less than or equal to the glass transition temperature of the lead-reduced glass;
    whereby salting-out of lead from the lead-containing glass is limited to when the lead-containing glass is in contact with an aqueous solution.

2. The method of claim 1, wherein the solution comprising perchloric acid is an aqueous solution of perchloric acid.

3. The method of claim 1, wherein the solution comprising perchloric acid comprises from 10$^{-3}$ mol/L to 10$^{-1}$ mol/L.

4. The method of claim 1, wherein the lead-containing glass is placed in contact with the solution comprising perchloric acid at ambient temperature.

5. The method of claim 1, wherein the lead-reduced glass is heated at a temperature lower than 150° C. below the glass transition temperature of the lead-reduced glass.

6. The method of claim 1, wherein the lead-reduced glass is heated at a temperature ranging from 200° C. to 700° C.

7. The method of claim 1, wherein the lead-reduced glass is heated for between 12 hours and 36 hours.

8. The method of claim 1, wherein the lead-containing glass is a crystal glass.

9. The method of claim 1, wherein the lead-reduced glass is heated at a temperature ranging from 300° C. to 600° C.

10. The method of claim 1, wherein the lead-containing glass comprises at least 30% by weight of lead oxide relative to the total weight of the glass.

11. The method of claim 1, wherein the lead-containing glass is for use with a food or a beverage.

12. The method of claim 11, wherein the lead-containing glass is a drinking glass or a carafe.

13. The method of claim 1, wherein the lead-containing glass is a jewel.

14. The method of claim 1, wherein the lead-reduced glass has the same appearance after the method as the lead-containing glass had before the method.

15. The method of claim 1, wherein the total amount of lead in the lead-reduced glass is reduced by at least a factor of 2 as compared to the lead-containing glass.

16. The method of claim 15, wherein the total amount of lead in the lead-reduced glass is reduced by at least a factor of 3 as compared to the lead-containing glass.

17. A method for treating a lead-containing glass, the lead-containing glass comprising at least 24% by weight of lead oxide relative to the total weight of the glass, the method consisting of the following steps:

(a) placing the lead-containing glass in contact with a solution comprising perchloric acid for between 12 and 36 hours;
(b) separating the lead-containing glass from the solution to provide a lead-reduced glass;
(c) heating the lead-reduced glass at a temperature less than or equal to the glass transition temperature of the lead-reduced glass.

\* \* \* \* \*